United States Patent [19]

Kuwabara et al.

[11] Patent Number: 4,972,400

[45] Date of Patent: Nov. 20, 1990

[54] OPTICAL PICKUP APPARATUS HAVING SWITCH FOR ALLOWING POSITIONAL ADJUSTMENT

[75] Inventors: Toru Kuwabara, Gunma; Kazuo Hirasawa, Kyoto; Kiyomitsu Nishimura, Hyogo, all of Japan

[73] Assignee: Mitsubishi Denki Kabushiki Kaisha, Tokyo, Japan

[21] Appl. No.: 173,949

[22] Filed: Mar. 28, 1988

Related U.S. Application Data

[63] Continuation of Ser. No. 882,600, Jul. 7, 1986, abandoned.

[30] Foreign Application Priority Data

Jul. 5, 1985 [JP] Japan ............................... 60-147989
Jul. 5, 1985 [JP] Japan ............................... 60-147990
Jul. 5, 1985 [JP] Japan ............................... 60-147991

[51] Int. Cl.$^5$ .............................................. G11B 7/09
[52] U.S. Cl. ............................. 369/44.29; 369/44.35; 369/120; 369/124
[58] Field of Search ........................... 369/44–46, 369/100, 106, 109, 120, 124, 112, 111, 44.27, 44.29, 44.35; 357/30, 30 G; 250/211 J, 578, 214 P, 214 A, 201 PF, 201.1, 201.5, 578.1; 358/342

[56] References Cited

U.S. PATENT DOCUMENTS

| | | | |
|---|---|---|---|
| 3,265,899 | 8/1966 | Bergstrom et al. | 369/120 |
| 3,530,258 | 9/1970 | Gregg et al. | 369/111 X |
| 3,962,721 | 6/1976 | de Haan . | |
| 4,093,961 | 6/1978 | Kanamaru . | |
| 4,305,657 | 12/1981 | Masunaga et al. | 250/201 PF X |
| 4,314,858 | 2/1982 | Tomasetta et al. . | |
| 4,321,462 | 3/1982 | Numata | 250/211 J |
| 4,366,377 | 12/1982 | Notthoff et al. | 250/211 J |
| 4,368,385 | 1/1983 | Kanbee et al. | 250/211 J X |
| 4,388,532 | 6/1983 | Garcia | 250/211 J |
| 4,407,010 | 9/1983 | Baji et al. | 357/30 X |
| 4,473,744 | 9/1984 | Mizokami | 250/214 P |
| 4,479,708 | 10/1984 | Tokuda | 250/214 P X |
| 4,494,132 | 1/1985 | Kohn | 250/211 J |
| 4,518,863 | 5/1985 | Fukuoka et al. | 250/211 J |
| 4,539,665 | 9/1985 | Iso et al. | 369/44 |
| 4,549,190 | 10/1985 | Ohara | 369/106 X |
| 4,617,654 | 10/1986 | Gross et al. | 369/46 |
| 4,636,980 | 1/1987 | Bluzer | 357/30 X |
| 4,663,751 | 5/1987 | Kaku et al. | 369/44 X |
| 4,672,471 | 6/1987 | Gouda | 358/342 X |
| 4,677,602 | 6/1987 | Okano et al. | 369/44 X |
| 4,683,560 | 7/1987 | Takeuchi et al. | 369/46 X |
| 4,737,946 | 4/1988 | Yamashita et al. | 369/112 X |
| 4,789,777 | 12/1988 | Takami et al. | 250/214 A |

FOREIGN PATENT DOCUMENTS

0174008 3/1986 European Pat. Off. .

OTHER PUBLICATIONS

Electro-Optical Systems Design, vol. 13, No. 1, 1/81, pp. 35–39, Chicago, U.S.A., V. P. O'Neil, "Using Integrated Detector/Pre-Amplifiers in Fiber Optics Systems".
Patent Abstracts of Japan, vol. 8, No. 282, p. 323, 12/22/84, & JP59-146455.

Primary Examiner—Aristotelis M. Psitos
Assistant Examiner—W. R. Young
Attorney, Agent, or Firm—Wolf, Greenfield & Sacks

[57] ABSTRACT

The invention comprises an optical pickup apparatus including a photodetector which detects a laser beam reflected from information tracks of a disk and an amplifier circuit which amplifies the outputs of the photodetector. The photodetector and the amplifier circuit are integrally combined. A preamplifier circuit is also provided for positional adjustments. A switch is included within the amplifier for alternately inhibiting the path of the outputs of the photodetector to the amplifier circuit to allow for positional adjustment with the preamplifier and enabling the path of the outputs of the photodetector to the amplifier circuit for normal operation.

9 Claims, 12 Drawing Sheets

OPTICAL PICKUP APPARATUS HAVING SWITCH FOR ALLOWING POSITIONAL ADJUSTMENT

BACKGROUND OF THE INVENTION:

1. Field of the Invention:

The present invention relates to an optical pickup apparatus which reads information with laser beam from an information recording medium where information is recorded in the tracks formed thereon.

2. Description of the Prior Art:

FIG. 1 shows the outline of an existing optical pickup of the 3-beam system. In FIG. 1, reference numeral 1 denotes a disk formed as an information recording medium with information recorded in the tracks formed thereon. Reference numeral 2 is an optical pickup which reads information recorded on this disk. This optical pickup 2 is composed of an optical system and a photodetector 6 which detects a light flux (pencil of rays) reflected from an information track of the disk and guided by the optical system. The optical system includes a laser source 3, a diffraction grating (not shown), a beam splitter 4 and an objective lens 5 to irradiate the disk with the light flux radiated from the laser source 3 and condense the light flux on the information tracks. Moreover, although not shown, a drive mechanism which focuses the light flux onto an information track and causes the light flux to follow accurately the information track is also provided.

The photodetector 6, as shown in FIG. 2, is composed of at least four center photodetecting (receiving) sections A-D which are symmetrically arranged with the axes crossing each other almost orthogonally and two sub-photodetecting (receiving) sections E and F arranged to be opposed to each other on both sides of such center photodetecting sections. The outputs of these photodetecting sections are amplified by amplifiers 9-11 and the details thereof are shown in FIG. 2.

In FIG. 2, the preamplifiers 7 and 8 are respectively connected to the center photodetecting section pairs A, C and B, D which are respectively arranged in the diagonal direction among the center detecting sections A-D of the photodetector 6 and thereby photoelectric currents generated by these photodetecting sections are converted into voltages and these voltages are added. A preamplifier 9 is connected to two sub-photodetecting sections E and F arranged on both sides of photodetector 6 and outputs a tracking error signal by converting photoelectric currents generated by the sub-photodetecting sections into corresponding voltages and executing subtraction between such voltages. The outputs of preamplifiers 7 and 8 are added in an HF amplifier 10 to provide the information which is recorded on the disk 1. The outputs of preamplifiers 7 and 8 are also subtracted in an amplifier 11 to provide a focus error signal. These amplifiers are respectively formed on a circuit board 12 isolated from the pickup 2 and flexible shield wires 13 connect the circuit board 12 and the output terminals of pickup 2.

The output of each photodetecting section of the photodetector 6 is also connected, as shown in FIG. 3, to a preamplifier array 14 and the outputs of this array are used for adjusting the position of the photodetector 6 built in the pickup 2.

With reference to FIG. 1, FIG. 2, FIG. 3 and FIG. 4 (described later), the operation of a conventional optical pickup is explained hereunder.

FIG. 4 shows patterns of reflected light flux irradiating the photodetector 6. The light flux irradiating the photodetector 6 is composed of three beams, namely the main beam 15 which is intended to irradiate the center photodetecting sections A-D to provide information signals and focus error signals and two sub-beams 16a and 16b which irradiate the sub-photodetecting sections E and F to provide tracking error signals.

Before positional adjustment of photodetector 6, as shown in FIG. 4(a), the photodetector 6 is deviated to a considerable extent from the light flux. Therefore, a position detection of sub-beams is carried out first utilizing outputs of the sub-photodetecting sections E and F. As shown in FIG. 4(a), when the sub-photodetecting section E is irradiated with the sub-beam 16b, an output $V_{Ea}$ can be obtained from the preamplifier array 14 (shown in FIG. 3) corresponding to the sub-photodetecting section E. Here, $V_{Ea}$ means an output $V_E$ (FIG. 3) in FIG. 4(a). In this case, the amount of light of a sub-beam is set to be smaller than that of a main beam and therefore which beam irradiates the sub-photodetecting section E can be detected by checking the value of output $V_E$.

Next, when said drive mechanism (not shown) causes the photodetector 6 to move to the position of FIG. 4(b) in the direction y in accordance with an output of the photodetector 6, the outputs $V_E$ and $(V_A+V_B+V_C+V_D)$ of FIG. 3 yield the relation, $V_{Eb} > (V_A+V_B+V_C+V_D)_b \approx V_{Ea}$ because of the pattern of reflected light flux.

When the photodetector 6 is further moved to the position of FIG. 4(c) in the direction y, the outputs $V_E$, $(V_A+V_B+V_C+V_D)$ and $V_F$ yield the relation, $(V_A+V_B+V_C+V_D)_c > V_{Ec} \approx V_{Fc}$ because of the pattern of reflected light flux.

The coarse positional adjustment of the photodetector is completed by such manipulations. Next, the fine adjustment in the direction y can be undertaken by making equal the output voltages $(V_A+V_B)$ and $(V_C+V_D)$ of the photodetector and that in the direction x can also be accomplished by making equal the output voltages $(V_A+V_D)$ and $(V_B+V_C)$. As a result, as shown in FIG. 4(d), the photodetector 6 can be set to an appropriate position for the light flux reflected from the disk.

Upon completion of the positional adjustment of the photodetector 6 as explained above, the preamplifier array 14 for positional adjustment is separated and the preamplifiers for reading information signals stored on the disk, focus error signals and tracking error signals is in turn externally connected, as shown in FIG. 2, to the external output terminals of the pickup 2.

As explained above, the light flux emitted from the laser source 3 focuses on the disk 1 through the optical system and the reflected light flux from the disk is again guided by the optical system to the photodetector 6. When the reflected light enters the photodetector 6, it generates a photoelectric current between ten and twenty microamperes in accordance with the intensity of reflected light and reads the information recorded on the disk 1 based on such photoelectric current, automatically adjusting the focus and tracking of pickup 2 for the disk 1.

In other words, the light flux reflected from the disk 1 is changed in intensity to enter the center photodetecting sections A-D in response to the presence or absence of pits and accordingly the photoelectric currents generated by the center photodetecting sections also change. The preamplifiers 7 and 8 add such photoelectric currents and moreover the HF amplifier 10 adds the outputs of the preamplifiers to provide an output HF=(A+C)+(B+D) from which recorded information can be extracted.

If the light flux for the disk 1 is not focused correctly, irradiation patterns of reflected light flux incident on the center photodetecting sections A–D change and such change appears as a change of output in the photoelectric currents. Such out-of-focus can be corrected by adjusting the focus adjusting mechanism (not shown) disposed within the pickup 2 in accordance with an output of FE preamplifier 11 in the form of FE=(A+C)−(B+D).

In the case of a so-called optical pickup of the 3-beam system which irradiates the disk 1 with three divided light fluxes, one of the two light fluxes disposed to the front and rear of the main beam deviate from the target track, and the reflected light flux deviates from any one of the sub-photodetecting sections E, F on either side and does not enter the sub-photodetecting section correctly. In such a case, the TE preamplifier 9 outputs a signal in order to drive the tracking adjusting mechanism (not shown).

The pickup 2 thus follows the information tracks with rotation of the disk 1 and sequentially reads recorded information through movement in the radial direction.

The photodetector 6, as explained heretofore, is composed of at least four center photodetecting sections 6a–6d which are symmetrically arranged with the axes orthogonal to each other and two sub-photodetecting sections 6e, 6f arranged to be opposed to each other on both sides of said center photodetecting sections (FIG. 5). As shown in FIG. 5, the outputs of photodetector 6 are generally supplied to a current-voltage converting circuit 17 composed of CMOS inverters which are respectively connected to each other and correspond to the photodetecting sections 6a–6f to provide a voltage output converted from the current of the photodetecting sections to an amplifier in the succeeding stage.

FIG. 6 shows one form of the structure of the photodetector 6. As shown in FIG. 6, the photodetector 6 includes the photodetecting sections 6a–6f formed by high concentration p-type diffused layers (hereinafter referred to as p+ diffused layers) on a low concentration n-type impurity doped substrate 18 (hereinafter referred to as n− substrate).

Meanwhile, FIG. 7 shows one form of the structure of a CMOS inverter forming the current-voltage conversion circuit 17 and coupled to the photodetector 6. In FIG. 7, the reference numeral 19 denotes n− substrate; 20 is p+ diffused layer; 21, 22 are oxide films; 23 is p+ diffused layer; 24 is p− diffused layer; 25, 26 are n− diffused layers; 27, 28 are conductive electrodes.

The laser beam emitted from the laser source 3 is divided by the diffraction grating (not shown) into one main beam and two sub-beams and these beams irradiate the tracks on the disk 1 through the objective lens 5. On the other hand, the reflected light from the disk 1 enters the objective lens 5, is divided by the beam splitter 4 and enters the photodetector 6. Namely, as shown in FIG. 5, the main beam irradiates the center photodetecting sections 6a–6d of the photodetector 6 and the sub-beams respectively irradiate the sub-photodetecting sections 6e and 6f which oppose each other.

Therefore, each of the photodetecting sections 6a–6f of the photodetector 6 supply photoelectric currents in accordance with the amount of light to the voltage converting circuit 17 from the external terminals and these photoelectric currents are converted therein into voltage signals. An electrical circuit of such voltage conversion circuit is shown in FIG. 8. At the detecting part of photodetector 6, a bias power source ($V_{cc}$) is connected through a resistor 29 and a capacitor 30 in order to prevent interference between output signals of photodetecting sections and a photoelectric current I is generated when the photodetecting sections are irradiated with light flux.

PROBLEMS IN THE PRIOR ART

The existing optical pickup has experienced a problem in that the assembly work is made complicated by the fact that both the information read-out preamplifier and the photodetector position adjusting preamplifier are connected externally and are independently connected.

Moreover, such optical pickup of the prior art also involves the problem that preamplifiers for amplifying the outputs of the photodetectors of the pickup are formed on a circuit board (12: FIG. 2) and these are connected with the pickup through flexible shield wires (13), but if the shield wires are too long, the characteristics are adversely affected so that load impedance becomes large, resulting in distortion of the output signal. Additionally, if the shield wire is not sufficiently flexible, the pickup cannot be moved freely.

In addition, an existing optical pickup connects a current-voltage conversion circuit for the photodetector through external terminals of the pickup and there is therefore a further problem in that the assembly work is complicated, the device itself becomes large in size which leads to an increase in the manufacturing cost, and, especially, the layout of the lead wires brings about a drop in the S/N ratio in the read-out signal.

SUMMARY OF THE INVENTION

Accordingly, it is an object of the present invention to provide an optical pickup apparatus which realizes positional adjustment with the read-out preamplifiers connected and also facilitates the work of assembly.

It is another object of the present invention to provide an optical pickup apparatus with improved characteristics which are attained by integrally combining the preamplifiers into a pickup device together with the photodetector.

It is a further object of the present invention to provide an optical pickup apparatus which has reduced manufacturing costs by reducing the size of the apparatus and also to improve the S/N ratio.

According to the present invention, an optical pickup apparatus comprises a laser source, an optical system which causes the light flux from the laser source to irradiate and condense on the information tracks of an information recording medium including recorded information in the tracks, a photodetector which detects the light flux reflected from said information tracks through said optical system, preamplifiers which amplify output signals of such photodetector and a means for switching to ON and OFF states output signals from said photodetector to said preamplifiers, wherein the preamplifiers are disconnected from the photodetector when said switch menas is open and the output signals of the photodetector can thereby be used for positional adjustment of the photodetector.

Moreover, the present invention provides an optical pickup apparatus which comprises a laser source, an optical system which causes the light flux from the laser source to irradiate and condense on the information tracks of an information recording medium recording information in the tracks, a photodetector which detects the light flux reflected from said information tracks through said optical system, preamplifiers for amplifying output signals of said photodetector being integrally combined together with the photodetector.

Whereby, the optical pickup apparatus of the present invention detects the reflected light flux from the information tracks of an information recording medium with the photodetector, amplifies photoelectric currents based on the amount of light detected with the combined preamplifiers and outputs such information from external terminals.

Furthermore, the present invention provides a pickup apparatus wherein the photodetector and the amplifier circuit for electrical signals from said photodetector are integrally formed on a single semiconductor substrate and the output signals of the photodetector are processed effectively by the amplifier circuit formed integrally on a single semiconductor substrate.

BRIEF DESCRIPTION OF THE DRAWINGS

The foregoing features and other aspects of the invention are explained in the following detailed description which is to be read with reference to the accompanying drawings, wherein.

DETAILED DESCRIPTION OF THE PREFERRED EMBODIMENTS

Figure 9:
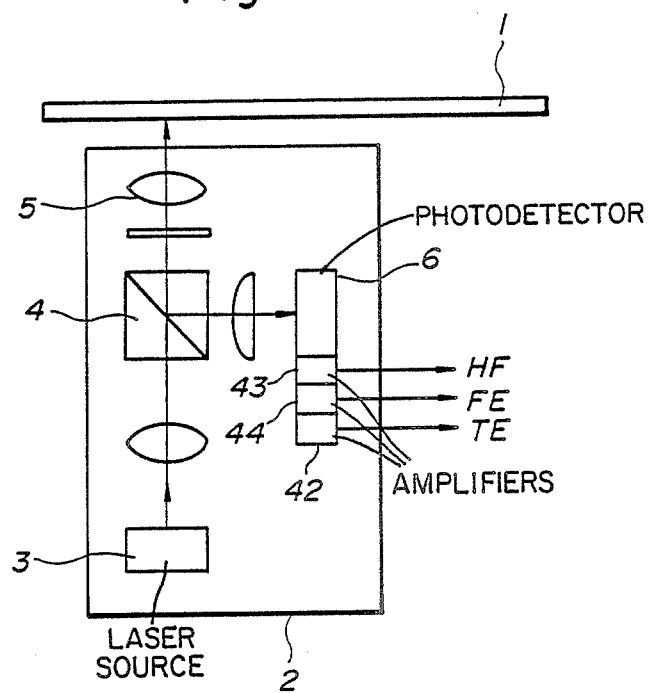
FIG. 9 and FIG. 10 respectively show in outline the structure of an embodiment of the optical pickup apparatus of the present invention and a block diagram thereof.
Figure 10:
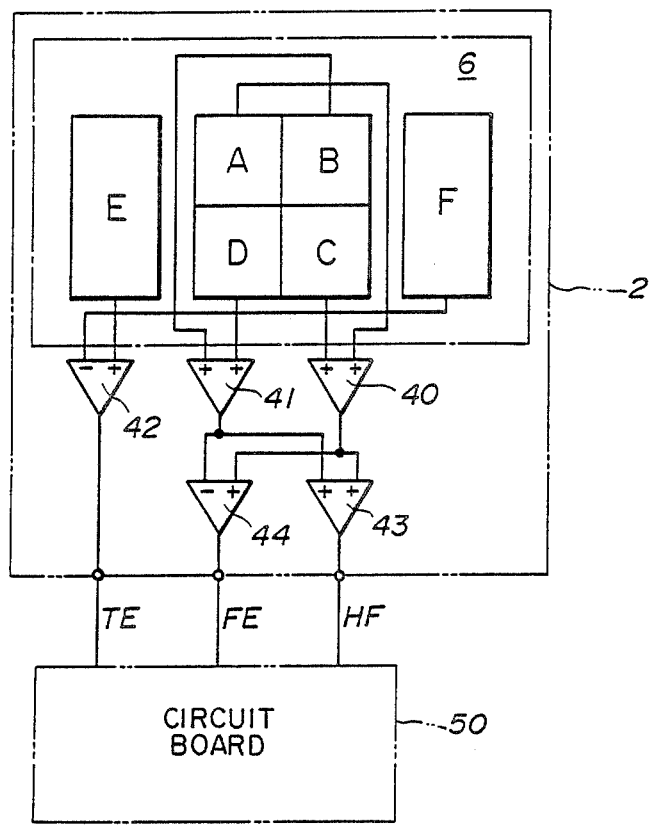

FIG. 9 and FIG. 10 are block diagrams of an optical pickup apparatus of the present invention integrally comprising preamplifiers for amplifying the output signals of a photodetector. The reference numerals 1-6 are given to elements which are similar to those in the prior art. In the present invention, a pickup 2 comprises two preamplifiers 40 and 41 connected to center photodetecting sections A-D of a photodetector 6, a TE preamplifier 42 which is connected to sub-photodetecting sections E and F and which provides tracking error signal outputs, an HF amplifier 43 which amplifies information from the outputs of said two preamplifiers 40, 41, and an HE preamplifier which provides a focus error signal. These amplifiers are all formed as an IC because they must be packaged within the small-sized pickup 2 and it is desirable to form them together with the photodetector 6 on the same chip. It is, however, also possible to form the amplifiers and the photodetector on different chips and to connect them with wire bonding.

The other electrical circuits which do not require the shield wires for connection are formed on a circuit board 50 which is connected with the external output terminals of the pickup 2 by means of ordinary lead wires.

With such structure, the photodetector 6 detects the reflected light flux from the disk 1, photoelectric currents of the level corresponding to the intensity of the reflected light flux are amplified by preamplifiers and are then output from external terminals of the pickup 2 and then input to a circuit formed on the circuit board 50 through lead wires. In a case where both photodetector 6 and the preamplifiers are formed on the same chip, these can be connected by means of a conductor about 1 mm in width and when these are formed on the different chips they are connected by means of a wire several mm in diameter.

Since the peripheral end of the pickup 2 is generally connected to the GND, it is comparatively resistive to the influence of external noise and even if it is not connected to the GND, a lead wire in which a weak photoelectric current flows can be made as short as 1/100 or less of the lead wire employed in the prior art system. Therefore, the influence of noise is reduced to become very small. Moreover, since the lead wires between the pickup 2 and the circuit board 50 convey the amplified HF, FE and TE signals which show sufficiently high signal levels, it is not required to use shield wires and it is possible to use soft wires which do not interfere with the movement of the pickup.

Therefore, the photodetector according to the present invention assures easy and smooth movement for the purposes of tracking the disk, is less subject to the influence of noise and provides an improved S/N ratio.

Figure 11:
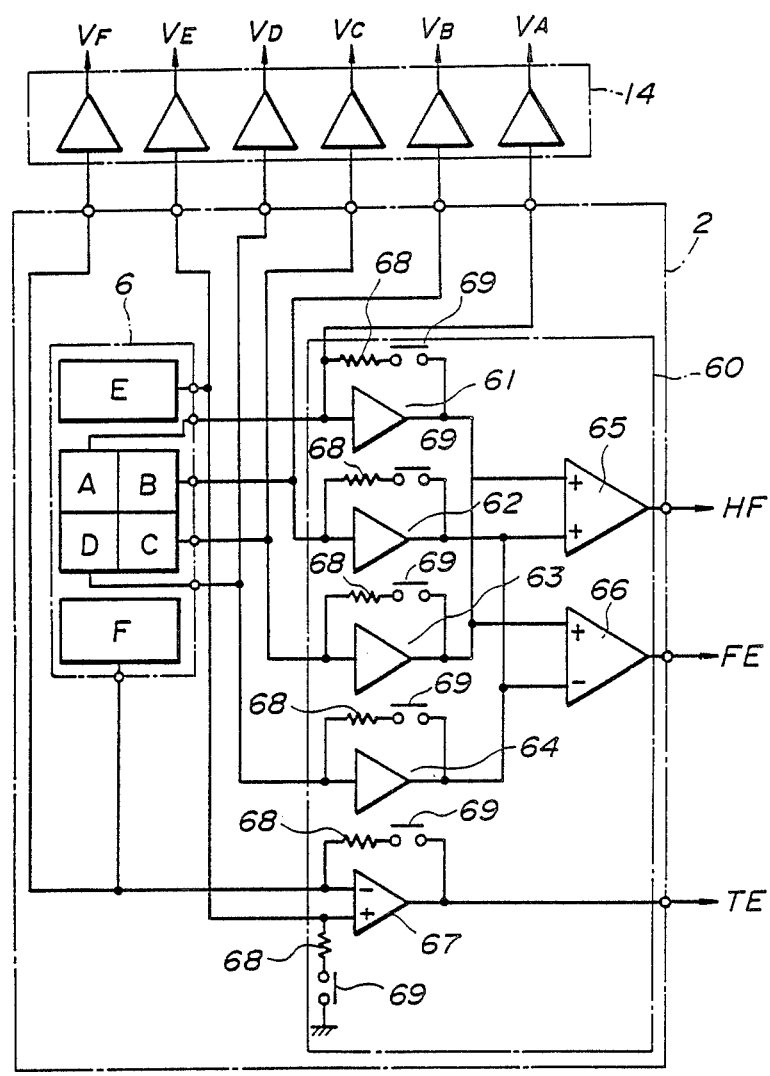
FIG. 11 is a circuit diagram indicating an other embodiment of the present invention.

FIG. 11 is a circuit diagram illustrating another embodiment of the present invention. The optical pickup 2 comprises, as in the case of the prior art, a laser source, a photodetector 6 which detects the reflected light from the disk guided by the optical system which causes the light flux from the laser source to irradiate the disk and condense thereon, and a driving mechanism which focuses accurately the light flux on the disk and causes the light to accurately trace the tracks on the disk.

The photodetector 6 is composed of at least four center photodetecting sections A-D arranged symmetrically with almost orthogonal axes and two subphotodetecting sections E, F arranged to be opposed to each other on both sides of said center photodetecting sections.

Numeral 60 denotes a preamplifier circuit for amplifying the output signals of the photodetector 6. This circuit is disposed in the pickup 2 and includes current-voltage conversion amplifiers 61–64 connected respectively to the center photodetecting sections A–D, a preamplifier 65 which adds the output signals of center photodetecting sections A–D and provides the read-out information, a preamplifier 66 which provides the difference between the output signals of pairs of center photodetecting sections A, C and B, D which oppose each other and outputs a focus error signal, and a current-voltage conversion amplifier 67 which provides the difference between the output signals of subphotodetecting sections E and F and outputs a tracking error signal, wherein switches 69 are connected in series to respective current-voltage conversion resistances 68 of the current-voltage conversion amplifiers 61–64 and the tracking error current voltage conversion amplifier 67 as shown, and these switches open and close at a suitable time by means of external intervention.

Numeral 14 denotes a preamplifier for adjustment which is connected as required to the external output terminals of the pickup 2, in tern connected to the photodetecting sections A–F.

The operation is explained hereunder. First, for the positional adjustment of photodetector 6 and measurement of focus sensor sensitivity and tracking sensor sensitivity, the preamplifier 14 is connected to the external output terminals and simultaneously the switch 69 is turned OFF. Thereby, a photoelectric current generated when the photodetector 6 is irradiated with laser beam enters the preamplifier 14 and then positional adjustment and measurement of focus sensor sensitivity and tracking sensor sensitivity can be carried out.

In this case, the adjustment preamplifier 14 is not influenced by the resistance value of the current-voltage conversion resistor 68. Thus, the adjustment of photodetector 6 is completed as described above, and the preamplifier 14 is separated in turn from the external output terminal. Thereafter, when the switch 69 is closed, the outputs of the center photodetecting sections A–D are connected to the current-voltage amplifiers 61–64 wherein the photoelectric currents are converted into voltage and provided as the information signal or focus error signal through the preamplifiers 65 and 66. Moreover, the outputs of the subphotodetecting sections E, F are supplied as the tracking error signal through the differential amplifier 67.

In the above embodiment, the output signals of all photodetecting sections of photodetector 6 are prevented from flowing into the preamplifier circuit, but the same effect can also be obtained even when a part of such photodetecting sections allows output signals to flow into the preamplifier circuit if an appropriate adjustment method or the content of measurement permits it.

Moreover, in the above embodiment, while the photodetector of the 3-beam system is employed, this photodetector can also be introduced into an optical pickup apparatus which extracts outputs of a photodetector using a current-voltage conversion circuit and allows positional adjustment of the photodetector and measurement of sensitivity characteristics using a current-voltage conversion circuit to be simultaneously carried out during assembly of the apparatus, resulting in the same effect as that of the above-described embodiment.

As explained, the present invention allows positional adjustment of a photodetector and measurement of sensor sensitivity to be realized while the preamplifier is connected because the photodetector and the preamplifier which amplifies the outputs of said photodetector can be interchangeably switched at need and can also be integrated mechanically and electrically.

Figure 8:
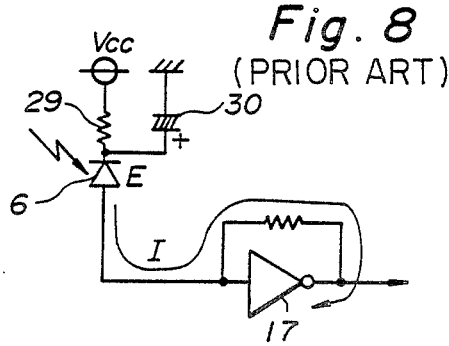
Figure 12:
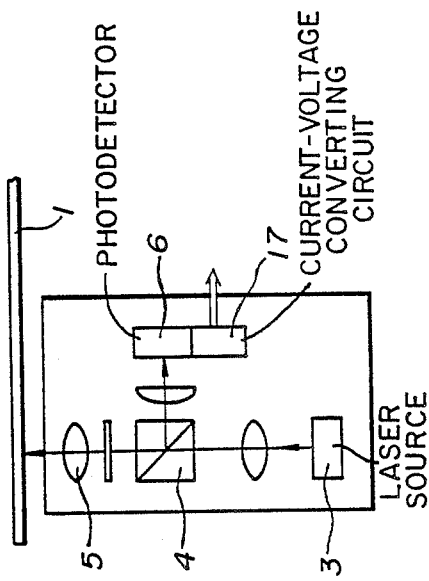
FIG. 12 is a block diagram indicating an alternative embodiment of the present invention.
Figure 13:
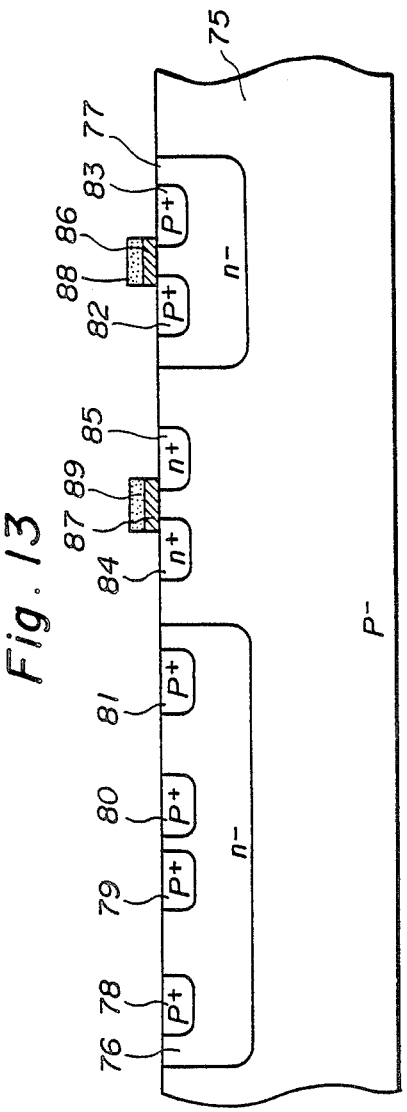
FIG. 13 is a sectional view of a semiconductor device forming a current-voltage converting circuit as shown in FIG. 12 and a photodetector.
Figure 14A:
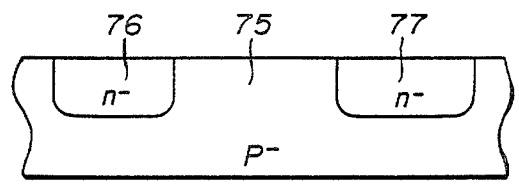
FIG. 14(a-e) is a sectional view illustrating the manufacturing process of a semiconductor device as shown in FIG. 13.
Figure 14B:
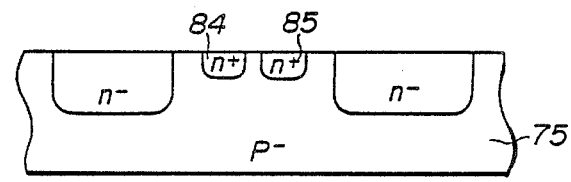
Figure 14C:
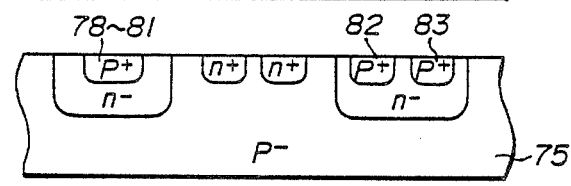
Figure 14D:
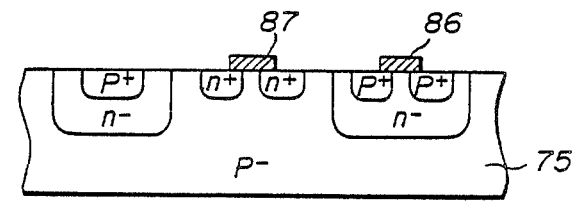
Figure 14E:
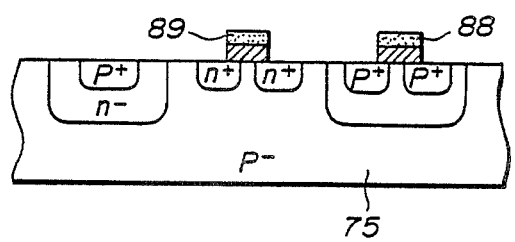
Figure 15A:
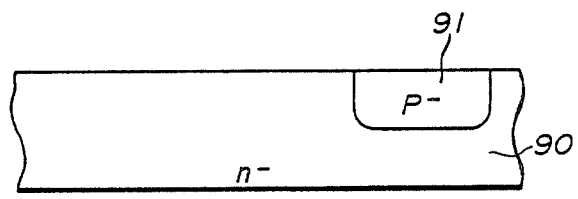
FIG. 15(a-e) is a sectional view illustrating another manufacturing process of a semiconductor device as shown in FIG. 13.
Figure 15B:
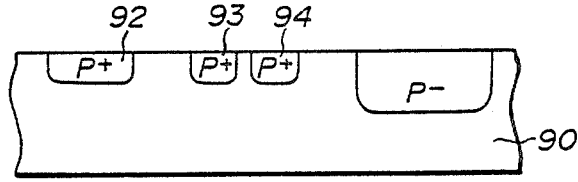
Figure 15C:
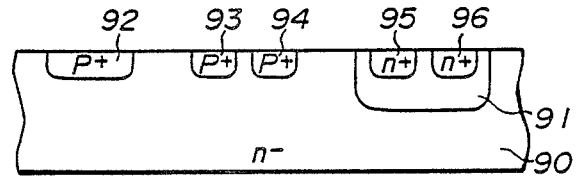
Figure 15D:
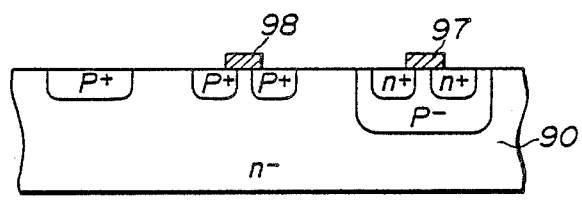
Figure 15E:
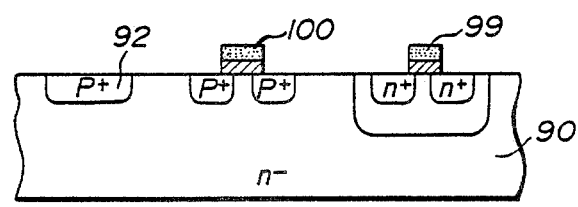

FIG. 12 is another embodiment of the present invention. In this embodiment, a current-voltage converting circuit 17 (FIG. 8) which amplifies the output signals of the photodetector 6 is formed on a single semiconductor substrate together with the photodetector 6. FIG. 13 is a cross-sectional view of a semiconductor device forming both the circuit 17 and a photodetector. A couple of n− islands 76, 77 are formed on the side of the main surface of p− semiconductor substrate 75, p+ source/drain regions 78–83 are formed by the impurity diffusion method on each of the islands and n+ source/drain regions 84, 85 are also formed in the region between such islands by the impurity diffusion method.

Moreover, gate oxide films (layers) 86, 87 and gate electrodes 88, 89 are provided in such a manner as to partly overlap each other in the respective regions in the p+ source/drain regions 82, 83 and the n+ source/drain regions 84, 85 of one of the islands.

Figure 1:
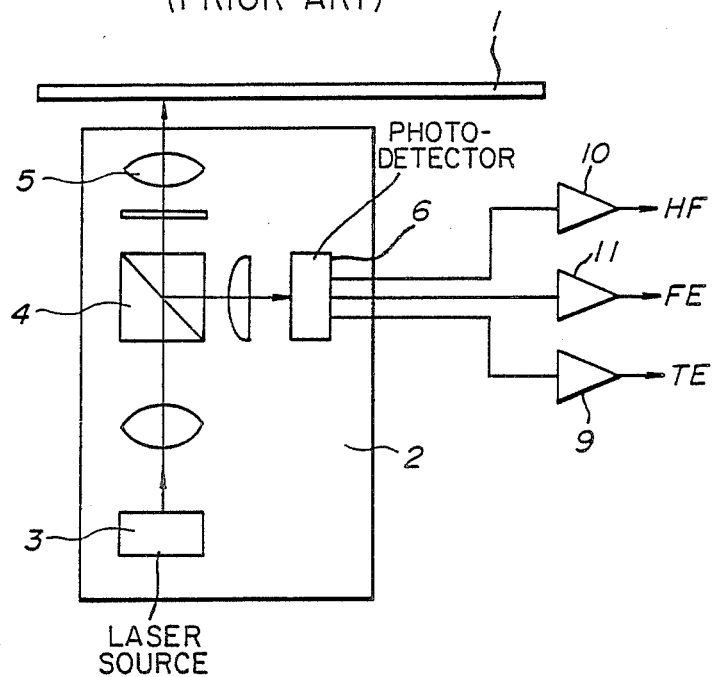
FIG. 1 is an outline of an existing optical pickup apparatus.
Figure 2:
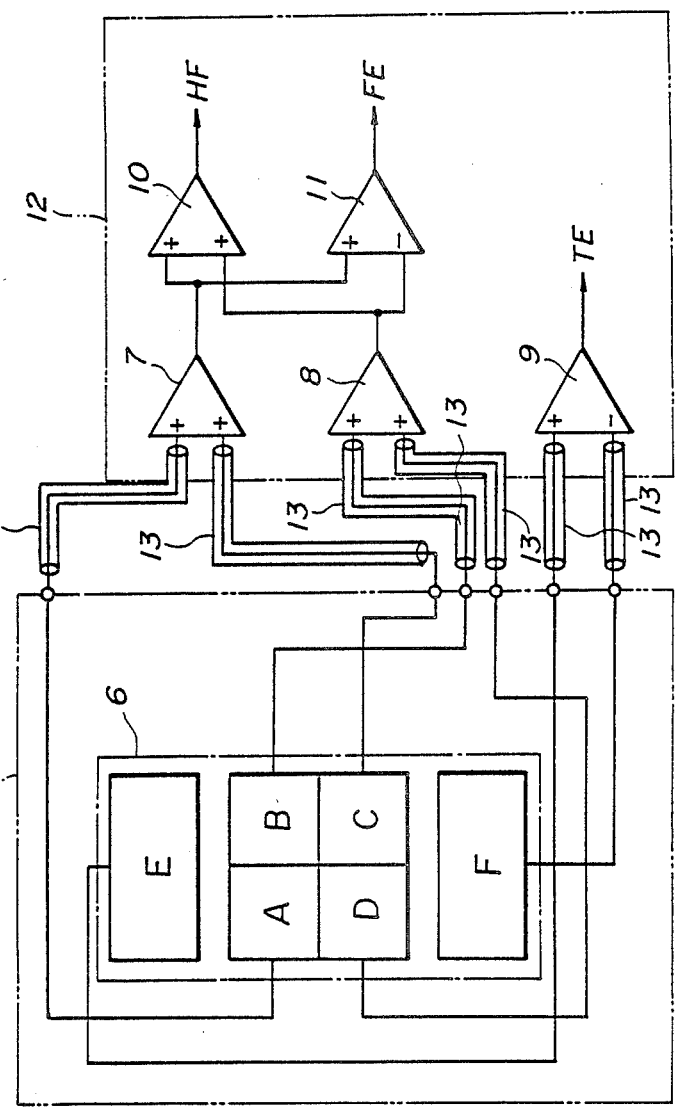
FIG. 2 is a block diagram of such optical pickup apparatus.
Figure 3:
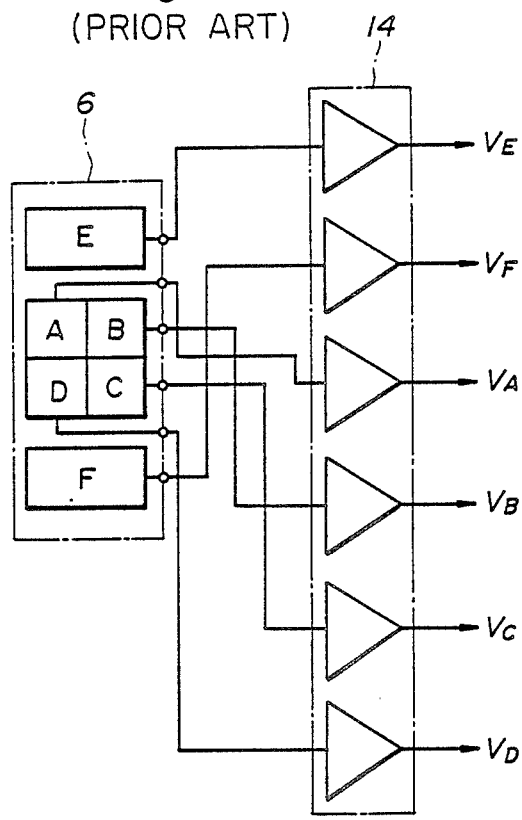
FIG. 3 shows a preamplifier array used for positional adjustment of photodetector 6.
Figure 4:
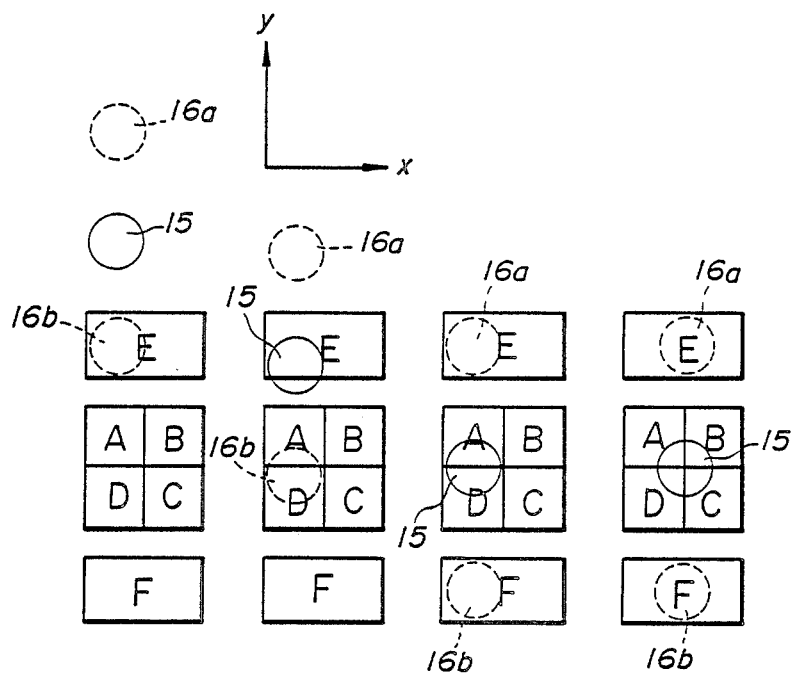
FIG. 4(a-d) shows optical beam pattern diagrams explaining the positional adjustment of photodetector 6 using three means.
Figure 5:
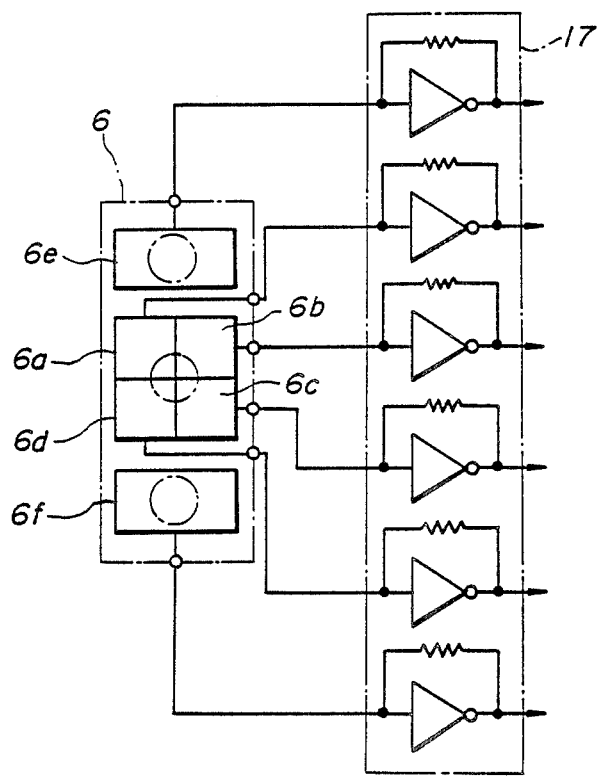
FIG. 5 is a schematic diagram of a current-voltage converting circuit to be connected to the photodetector.
Figure 6:
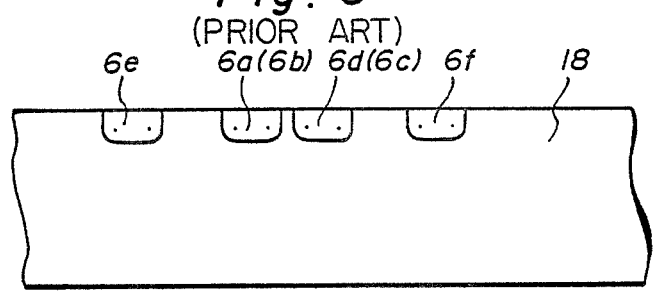
FIG. 6, FIG. 7 and FIG. 8 are a cross-sectional view of the structure of the photodetector shown in FIG. 5, a cross-sectional view of the structure of a CMOS inverter which forms a current-voltage converting circuit and a schematic diagram illustrating the connection between the photodetector and current-voltage converting circuit, respectively.
Figure 7:
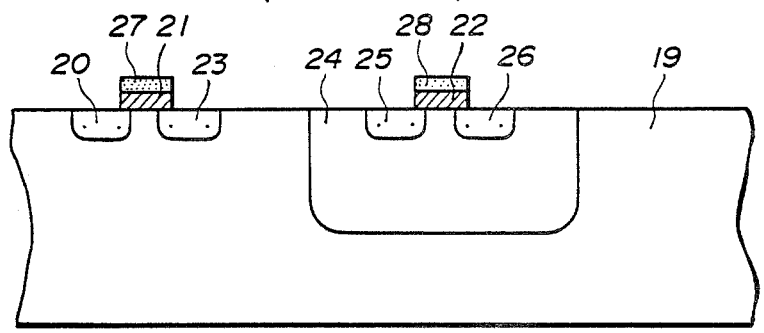

Namely, the p+ source/drain regions 78–81 in such a semiconductor device correspond to each photodetecting sections 6a–6f (FIG. 5) of the photodetector 6, while the p+ source/drain regions 82, 83 having the gate electrode and the n+ source/drain region 84 form a current-voltage conversion circuit 17 as a complementary field effect transistor (CMOS).

FIG. 14 shows cross-sectional views of such a semiconductor device, illustrating the manufacturing process. First, the n− islands 76, 77 are formed on the side of the main surface of a semiconductor substrate 75 by the impurity diffusion method and the n+ source/drain regions 84, 85 are also formed by the impurity diffusion method on the same side.

Next, the p+ source/drain regions 78–83 are formed by the impurity diffusion method on the n− islands 76, 77, the gate oxide films 86, 87 are deposited in such a manner as to partly overlap each region, in the portion occupied by the p+ source/drain regions 82, 83 and the n+ source/drain regions 84, 85, and conductive gate electrodes 88, 89 are formed on these gate oxide films.

Therefore, the p+ source/drain regions 78–81 become the anode of photodetector 6, and the p+ source/drain regions 82, 83 having the electrodes and the n+ source/drain regions 84, 85 respectively become the P channel and N channel of the complementary field effect transistors.

FIG. 15 shows another profile of the present invention, namely sectional views of a semiconductor device using n− substrate which illustrate the manufacturing process thereof. First, a p− island 91 is formed by the impurity diffusion method on the side of the main surface of n− semiconductor substrate 90 and p+ source/drain regions 92–93 are also formed by the impurity diffusion method.

Next, n+ source/drain regions 95, 96 are formed by the impurity diffusion method on the n− island 91, gate oxide films 97, 98 are deposited in such a manner as to partly overlap each region on the n+ source/drain regions 95, 96 and the p+ source/drain regions 93, 94, and conductive gate electrodes 99, 100 are formed on these gate oxide films.

Therefore, according to this profile, the p+ source/drain region 92 is the photodetector and the anode thereof and the substrate 90 is directly used as the cathode of such photodetector.

As explained above, the present invention ensures that since the photodetector and the amplifier circuits for amplifying the outputs thereof are formed on the same semiconductor substrate, the total size of the semiconductor device can be reduced and the SN ratio can also be improved.

Having described preferred embodiments of the invention, it will be apparent to those skilled in the art that other embodiments within the scope of the invention may also be adopted.

What is claimed is:

1. An optical pickup apparatus comprising a laser source, an optical system which irradiates information tracks with a light flux sent from the laser source on an information recording medium where information is recorded and condenses the light flux on said track, a photodetector which detects reflected light flux from said information track after it is guided by said optical system and has an output which contains information from said information tracks, positional information for said photodetector, focusing error information and tracking error information, and first circuit means for providing, in response to said photodetector, a control signal which can be used for positional adjustment of said photodetector, a first circuit path coupled between said photodetector and said first circuit means, and second circuit means having second circuit paths coupled from said photodetector for providing, in response to said photodetector, an information read-out signal, a focusing error signal and a tracking error signal, said second circuit means including switch means having a first position in which said second circuit paths are substantially inhibited thereby enabling said first circuit path to receive signals from said photodetector without being affected by said second circuit means, and said switching means having a second position in which said second circuit paths are enabled to provide said information read out signal, focusing error signal and tracking error signal.

2. An optical pickup apparatus according to claim 1 wherein said photodetector and switching means are integrally formed on an integrated circuit.

3. An optical apparatus according to claim 1 wherein said first circuit means comprises a preamplifier circuit for amplifying the output signal of said photodetector.

4. An optical pickup apparatus as set forth in claim 1 wherein said first circuit path comprises terminal means and means connecting said photodetector to said terminal means, said first circuit means comprising amplifier means usable for positional adjustment and adapted to be alternately coupled and uncoupled from said terminal means, said first circuit path maintained coupled to said photodetector in both said first and second positions of said switching means.

5. An optical pickup apparatus as set forth in claim 1 wherein a portion of said first circuit means is detachable from said photodetector.

6. An optical pickup apparatus as set forth in claim 1 wherein said first circuit means is detachable from said first circuit path such that said first circuit path remains coupled to said photodetector when said first circuit means is detached from said first circuit path.

7. An optical pickup apparatus comprising a laser source, an optical system which irradiates information tracks with a light flux sent from the laser source on an information recording medium where information is recorded and condenses the light flux on said track, a photodetector which detects reflected light flux from said information track after it is guided by said optical system, first circuit means having a first circuit path coupled from said photodetector for providing, in response to said photodetector, a control signal which can be used for positional adjustment of said photodetector, and second circuit means having a second circuit path coupled from said photodetector for providing, in response to said photodetector, an information read-out signal, said second circuit means including switching means for inhibiting and enabling said second circuit path such that, when said second circuit path is inhibited, said first circuit path is substantially enabled to receive signals from said photodetector without interference from said second circuit means, and wherein said switching means comprises a current to voltage conversion amplifier and a series connection of a resistor and a switch connected between an input terminal and an output terminal of said current to voltage conversion amplifier.

8. An optical pickup apparatus comprising a laser source, an optical system which irradiates information tracks with a light flux sent from the laser source on an information recording medium where information is recorded and condenses the light flux on said track, a photodetector which detects the reflected light flux from said information track after it has been guided by said optical system, said photodetector having an output which includes said information from said recording medium and positional, focusing and tracking information, first circuit means for providing, in response to said photodetector, an output signal adapted to be used for positional adjustment of said photodetector, a first circuit path coupled between said photodetector and said first circuit means, and second circuit means having second circuit paths coupled from said photodetector for providing, in response to said photodetector, an information read-out signal, focusing error signal and tracking error signal said first circuit path comprising terminal means and means for connecting said photodetector to said terminal means, said second circuit paths including switching means having a first position in which said second circuit paths are substantially inhibited, said terminal means adapted to be connected to said first circuit means during the provision of said output signal, and said switching means having a second position in which said second circuit paths are enabled to provide said information read out signal, focusing error signal and tracking error signal, said first circuit means adapted to be disconnected from said terminal means when said switching means is in said second position.

9. An optical pickup apparatus comprising a laser source, an optical system which irradiates information tracks with a light flux sent from the laser source on an information recording medium where information is recorded and condenses the light flux on said track, a photodetector which detects reflected light flux from said information track after it is guided by said optical system, said photodetector having an output which includes said information from said recording medium and positional, focusing and tracking information, first circuit means having a first circuit path coupled from said photodetector for providing, in response to said photodetector, a control signal which can be used for positional adjustment of said photodetector, and second circuit means having second circuit paths coupled from said photodetector for providing, in response to said photodetector, an information read-out signal, focusing error signal, and tracking error signal, said second circuit means including switch means having a first position in which said second circuit paths are substantially inhibited thereby enabling said first circuit path to receive signals from said photodetector without interference from said second circuit means, and said switching means having a second position in which said second circuit paths are enabled to provide said information read out signal, focusing error signal and tracking error signal.

* * * * *